(12) United States Patent
Belmonte et al.

(10) Patent No.: US 6,834,144 B2
(45) Date of Patent: Dec. 21, 2004

(54) GAIN FLATTENING OPTICAL FILTER, OPTICAL AMPLIFIER COMPRISING SUCH AN OPTICAL FILTER AND METHOD FOR MANUFACTURING SUCH AN OPTICAL FILTER

(75) Inventors: Michele Belmonte, Lodi (IT); Maurizio Tormen, Belluno (IT)

(73) Assignee: Avanex Corporation, Fremont, CA (US)

( * ) Notice: Subject to any disclaimer, the term of this patent is extended or adjusted under 35 U.S.C. 154(b) by 79 days.

(21) Appl. No.: 10/236,702

(22) Filed: Sep. 5, 2002

(65) Prior Publication Data

US 2003/0059165 A1 Mar. 27, 2003

Related U.S. Application Data

(60) Provisional application No. 60/322,458, filed on Sep. 17, 2001.

(30) Foreign Application Priority Data

Sep. 7, 2001 (EP) ............................................ 01121439

(51) Int. Cl.⁷ ................................................ G02B 6/34
(52) U.S. Cl. .......................................... 385/37; 385/10
(58) Field of Search ............................... 385/10, 37–39, 385/147

(56) References Cited

U.S. PATENT DOCUMENTS

| | | | |
|---|---|---|---|
| 5,757,487 A | * 5/1998 | Kersey | 356/450 |
| 5,982,963 A | 11/1999 | Feng et al. | 385/37 |
| 6,072,926 A | 6/2000 | Cole et al. | 385/37 |
| 6,130,973 A | 10/2000 | Lauzon et al. | 385/37 |
| 6,169,831 B1 | 1/2001 | Adams et al. | 385/37 |
| 2003/0059165 A1 | * 3/2003 | Belmonte et al. | 385/37 |
| 2003/0210864 A1 | * 11/2003 | Sugden et al. | 385/37 |

FOREIGN PATENT DOCUMENTS

WO 98/08120 8/1997 ............ G02B/6/16

OTHER PUBLICATIONS

"Custom Design Of Long Chirped Bragg Gratings: Application To Gain–Flattening Filter With Incorporated Dispersion Compensation", Ibsen et al., IEEE Photonics Technology Letters, vol. 12, No. 5, May 2000, p. 498–500.

"EDFA Gain Equalizer Employing Linearly Chirped Apodized Fiber Gratings", Capmany J et al., Microwave And Optical Technology Letters, vol. 12, No. 3, Jun. 20, 1996, pp. 158–160, XP002085849.

* cited by examiner

Primary Examiner—Akm Enayet Ullah
(74) Attorney, Agent, or Firm—Moser, Patterson & Sheridan, L.L.P.

(57) ABSTRACT

An optical signal amplification device (200) comprises an optical amplifier (210) having a wavelength-dependent gain and an equalization device (100) optically coupled in series to the optical amplifier and having a wavelength-dependent transmission function that substantially equalize the gain of the optical amplifier, the equalization device comprising a waveguide Bragg grating having a substantially constant refractive index envelope and a chirp rate that varies in such a way as to obtain the wavelength-dependent transmission function.

11 Claims, 6 Drawing Sheets

GAIN FLATTENING OPTICAL FILTER, OPTICAL AMPLIFIER COMPRISING SUCH AN OPTICAL FILTER AND METHOD FOR MANUFACTURING SUCH AN OPTICAL FILTER

CROSS-REFERENCE TO RELATED APPLICATIONS

This application claims the benefit of priority of European Patent Application Serial No. EP01121439.2 filed on Sep. 7, 2001 and U.S. Provisional Application Serial No. 60/322,458 filed on Sep. 17, 2001.

BACKGROUND OF THE INVENTION

1. Field of the Invention

The present invention relates to a gain flattening optical filter, to an optical amplifier comprising such an optical filter and to a method for manufacturing such an optical filter.

2. Technical Background

In this description, reference is made to optical fibres, but this reference shall be intended as a matter of example only and not as a limitation, since the technology described is equally applicable also to integrated optical waveguides.

Typically, the optical fibres used for telecommunications have the core doped with germanium to alter the refractive index. Doping with germanium induces a photosensitivity property to the UV radiation, which can be used to locally modify the refractive index through UV illumination, in such a way as to obtain a Bragg grating in the optical fibre.

As known, an optical fibre Bragg grating is a portion of fibre that has, in its core, an essentially periodic longitudinal modulation of the refractive index. Said structure has the property of back-reflecting the light passing through it in a wavelength band centered around a predetermined wavelength $\lambda_B$, known as Bragg wavelength. The Bragg wavelength $\lambda_B$ is related to the effective refractive index $n_{\mathit{eff}}$ and to the grating period $\Lambda(z)$ (both typically being function of coordinate z along the fibre axis) by the following Bragg phase-matching condition (see, for example, international patent application WO 99/31537):

$$\lambda_B = 2n_{\mathit{eff}} \Lambda(z) \quad (1)$$

By selectively reflecting a predetermined wavelength band, an optical fibre Bragg diffraction grating may be interposed in an optical fibre transmission line to filter a multi-wavelength optical signal.

The pattern of the refractive index n along axis z of the fibre can be expressed as follows:

$$n(z) = n_0(z) + \Delta n(z) \sin(2\pi z/\Lambda(z)) \quad (2)$$

where $n_0(z)$ is the local mean value of the refractive index (hereinafter also referred to as "mean refractive index") and $\Delta n(z)$ represents the local envelope of the refractive index modulation (shortly referred to as "refractive index envelope", or alternatively as "refractive index modulation amplitude"). More precisely, $\Delta n(z)$ defines, for each position z along the fibre, the distance between the upper and the lower envelope lines of the refractive index representative curve. For example, when the upper ad the lower envelope lines are straight lines, their distance and, therefore, the refractive index envelope $\Delta n(z)$, are constant. The effective refractive index $n_{\mathit{eff}}$ is proportional to the mean refractive index $n_0(z)$ through a term defining the confinement factor (typically indicated with Γ) of the fundamental mode of the fibre.

A known method for writing periodic refractive index lines in the fibre comprises directing a UV writing beam onto the fibre through a periodic phase-mask facing the fibre, so as to illuminate the fibre with a predetermined UV fringe pattern. The pitch of the lines or fringes of the interference patter projected onto the fibre is half that of (i.e. twice as close as that of) the lines physically present (e.g. etched) in the phase mask. For example, if the phase mask has a "physical" pitch of 1 μm, the lines projected onto the fibre have a pitch of 0.5 μm.

A different technique for writing periodic refractive index lines makes use of a holographic arrangement for generating an appropriate UV fringe pattern on the fibre lateral surface.

On the basis of the pattern of the refractive index, uniform gratings, so-called "chirped" gratings and apodised gratings are known.

In uniform gratings, the terms $n_0(z)$, $\Delta n(z)$ and $\Lambda(z)$ are constant. The reflection spectrum of a uniform grating typically exhibits a central peak at the Bragg wavelength, and a plurality of secondary lobes. Said secondary lobes can be disadvantageous in some applications, for example when the Bragg grating is used to filter a channel (centered at a predetermined wavelength) in a multi-channel optical transmission system. In this case, in fact, the secondary lobes of the reflection spectrum introduce an undesired attenuation in the transmission channels adjacent that to be filtered.

In apodised gratings, the term $\Delta n(z)$ is suitably modulated in order to have a reduction of secondary lobes. Such a grating can thus be advantageously used for filtering a channel in a multi-channel system, since it reduces the above-mentioned problem of the attenuation of the channels adjacent that filtered.

In chirped gratings, either of the terms $n_0(z)$ and $\Lambda(z)$ is variable, and the chirping may be referred to as "amplitude chirping" or "pitch chirping", respectively. Due to the variability of $n_0(z)$ or $\Lambda(z)$, and due to the fact that—according to what stated above—the Bragg wavelength is proportional to the product between $n_0(z)$ and $\Lambda(z)$, chirped gratings have a relatively broad reflection band. FIGS. 1a, 1b and 1c respectively show the qualitative pattern of the refractive index in the case the term $n_0(z)$ is modulated, the qualitative pattern of the refractive index in the case the term $\Lambda(z)$ is modulated (for example, with a continuous variation form about 500 nm to about 502 nm), and the typical reflection spectrum of a chirped grating. As it can be noted from FIG. 1c, the reflection spectrum shows a peak that is relatively broad.

Pitch chirping is predominantly used, as it offers broader grating bandwidths and relative ease of production. The chirp can be incorporated in to the fibre during the fabrication process ("intrinsic chirp") or can be obtained by applying an external perturbation to a fibre already including a non-chirped grating ("extrinsic chirp").

Intrinsic chirp can be introduced in different ways, for example by using a non-uniform period phase-mask, by subjecting the filter to strain of temperature gradients during the writing process, by writing gratings on pre-strained fibres or in fibre tapers, by curving the fibre in a standard phase-mask set-up, by tilting the fibre with respect to a phase-mask, or by interfering wavefronts of dissimilar curvatures in a holographic arrangement. These methods of writing broad-bandwidth gratings, which require very good mechanical stability and spatial coherence properties of the writing beam, suffer from the disadvantage of allowing a limited choice of filter spectral response.

To form an extrinsic chirp, external perturbations such as strain gradients or temperature gradients can be used. This external perturbation can also be used to vary the chirp so as to tune the filter spectral response. U.S. Pat. No. 6,169,831, in the name of Lucent Technologies, for example, teaches how to use a temperature gradient or a strain gradient as an extrinsic gradient for this purpose. These devices have, however, the drawback that relatively large external gradients perturbations are required to obtain a suitable range of chirping, and such perturbations may have a negative impact on the reliability of the fibre.

It is known to use chirped gratings for compensating the chromatic dispersion in a WDM transmission system.

WO 98/08120, in the name of PIRELLI CAVI E SISTEMI S.P.A., tackling the problem of chromatic dispersion, proposes a technique (defined "Continuous Fibre Grating Technique") to produce a fibre grating suitable to compensate said dispersion. According to this technique, a fibre, exposed through a mask to a UV radiation periodically time modulated, is continuously translated along its axis by a translation stage, so that subsequent exposures produce overlapped fringes. Arbitrary phase profiles and in particular a linear chirp can be built up by inducing phase shifts along the grating as it is fabricated.

WO 98/08120 also refers to a previously developed technique, described in U.S. Pat. No. 6,072,926 (Cole et al.), wherein a phase mask is scanned by a writing laser beam to generate the grating pattern. The fibre and the phase mask are moved with respect to one another during the writing process, to vary the grating properties along the length of the grating. Relative movement in a single direction provides a change of grating pitch, and so can be used to fabricate chirped or multi-wavelength gratings. Bi-directional dither alters the strength of the grating, and so can be used to fabricate apodised gratings.

WO 099/31537, in the name of University of Southern California, describes a nonlinearly-chirped fibre grating for achieving tunable dispersion compensation, chirp reduction in directly modulated diode lasers, and optical pulse manipulation. The nonlinearly-chirped fibre grating may be made by a near-UV technology that uses an interference pattern produced by a phase mask, and has a mechanism to adjust the Bragg phase-matching condition. In one embodiment, the grating is made of a mechanically stretchable or compressible material and has a nonlinearly chirped grating period, and a transducer is engaged to the grating to uniformly change the overall length of the grating, thus providing a spectral shift in the operating spectral range. In another embodiment, the grating has a uniform grating period and a nonlinearly chirped effective index of refraction along the grating direction, and the grating material is responsive to a spatially-varying external control field (such as an electric field, an electromagnetic field, or a temperature field) so that the nonlinear chirp can be adjusted to change relative delays of different spectral components. In yet another embodiment, the grating has a nonlinearly chirped grating period and an externally adjustable spatial profile in the effective index of refraction. The overall length and the effective index of refraction of the grating can be individually adjusted to change the relative delays of different spectral components and to shift the operating spectral range of the grating.

A different application of fibre Bragg grating is for gain equalization of optical amplifiers in multi-wavelength transmission systems. For this application, apodised Bragg grating, sometimes chirped, are typically used.

The article of M. Ibsen et al., "Custom Design of Long Chirped Bragg Gratings: Application to Gain Flattening Filter with Incorporated Dispersion Compensation", IEEE Photonics Technology Letters, Vol. 12, No. 5, May 2000, presents and experimentally demonstrates relationships between the refractive index modulation, the chirp-rate or dispersion and the transmission loss through, and reflection of, chirped Bragg gratings, and applies them to the design of a gain flattening filter with incorporated dispersion compensation. In the described example, the grating (which is going to be operated in reflection) is apodised over 10% of the total length at either ends, in order to reduce the ripples in the reflection and dispersion profiles.

U.S. Pat. No. 6,130,973, in the name of Institut National D'Optique, relates to a method and an apparatus to photo-induce a grating in an optical fibre. In a preferred embodiment, a laser beam is deflected by a mirror towards the fibre at an angle of incidence generally perpendicular to the waveguide axis. A phase mask facing the fibre generates an interference pattern, which produces the modulated refractive index change in the fibre. By modulating a galvanometer that controls the orientation of the mirror, the angle of incidence of the beam is dithered. By choosing an appropriate fraction of the exposure time during which the writing beam is dithered for each writing step, any profile of both the intensity of the modulated refractive index change and its average value may be defined independently. U.S. Pat. No. 6,130,973 also describes how to spectrally design a gain-flattening filter to be incorporated in the middle of a two-stages Erbium Doped Fibre Amplifier (EDFA).

SUMMARY OF THE INVENTION

The Applicant has tackled the problem of realizing an alternative Bragg grating optical filter for gain equalization of an optical amplifier.

The Applicant has found that, starting from an optical amplifier having a predetermined gain spectrum in a predetermined wavelength band, it is possible to realize an optical waveguide Bragg grating that has a chirp rate that varies in such a way as to have a transmission spectral response suitable to equalize said gain spectrum in said wavelength band, and that has a substantially constant refraction index envelope (i.e. substantially no apodisation). Preferably, also the mean refractive index no(z) is substantially constant.

The Applicant has verified that the optical filter so obtained has axial dimensions that are lower than that of optical filters formed by apodised Bragg grating, and the optical filter can therefore be housed in a smaller a thermal packaging.

The Applicant has also found that a Bragg grating as described above, having a non-linear chirp suitable to reproduce a particular target transmission spectrum, can be realized by scanning a UV beam on a linearly chirped phase mask facing the waveguide while the waveguide is translated at a constant speed, the beam being scanned with a predetermined motion law (in particular with a velocity variable in a continuous way) that is related to the particular target transmission spectrum.

According to an embodiment of the present invention that relates to an optical signal amplification device, comprises an optical amplifier having a wavelength-dependent gain in a predetermined wavelength band and an equalization device optically coupled in series to the optical amplifier. The equalization device having a wavelength-dependent transmission function that substantially equalizes the gain of the optical amplifier in said wavelength band. The equalization device includes a waveguide Bragg grating, preferably a fibre Bragg grating, having a substantially constant refractive index envelope and a chirp rate that varies in such a way as to obtain said wavelength-dependent transmission function.

The optical amplifier may comprise an active fibre coupled in series to the equalization device, or a first and a second active fibre coupled in series to the equalization device; in this second case, the equalization device is preferably interposed between the first and the second active fibre.

According to an embodiment of the present invention an optical transmission system comprises an optical transmitter adapted to generate optical signals, an optical transmission line for transmitting the optical signals, and an optical receiver for receiving the optical signals from the optical transmission line. At least one of said optical transmitter, optical transmission line and optical receiver comprises an optical signal amplification device as previously described.

According to one embodiment of the present invention a gain flattening optical filter comprises an optical waveguide Bragg grating, preferably a fibre Bragg grating, having a substantially constant refraction index envelope and a chirp rate that varies in such a way as to have a transmission spectral response suitable to equalize the gain spectral response of a predetermined optical amplifier in a predetermined wavelength band.

The gain flattening optical fiber is preferably a trasmissive amplitude filter. According to one embodiment of the present invention also a method for manufacturing an optical filter suitable for gain equalization of an optical amplifier in a predetermined wavelength band, comprises the steps of providing a photosensitive waveguide in a writing position along a z axis;

scanning a UV beam at a first velocity along the z axis through a linearly chirped phase mask facing the photosensitive waveguide, so as to generate UV fringe patterns; and translating the photosensitive waveguide at a second velocity along the z axis during the step of scanning the UV beam, so as to expose different portions of the photosensitive waveguide to successive UV fringe patterns; and modulating the UV beam in a periodic way related to the position of the photosensitive waveguide during translation thereof, so as to superimpose successive UV fringe pattern exposures; wherein the step of scanning the UV beam comprises varying the first velocity in such a way as to produce a nonlinearly-chirped Bragg grating having a substantially constant refractive index envelope and a transmission function suitable to equalize the gain spectrum of the optical amplifier in said wavelength band. The second velocity is preferably substantially constant and the step of scanning the UV beam preferably comprises translating a mirror that deflects the UV beam.

BRIEF DESCRIPTION OF THE DRAWINGS

The invention will be described hereinafter with particular reference to the following figures, representing a preferred, non-limiting embodiment thereof.

DETAILED DESCRIPTION OF THE PREFERRED EMBODIMENTS

Figure 1A:
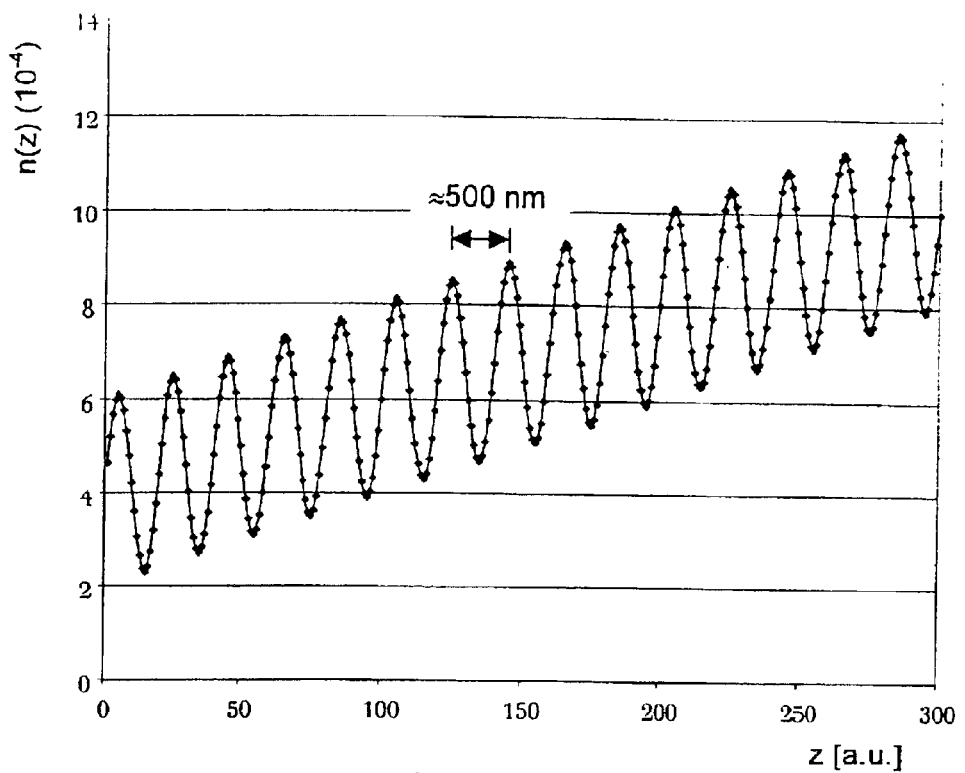
FIG. 1a shows the pattern of the refractive index in a chirped Bragg grating with variable mean refractive index.
Figure 1B:
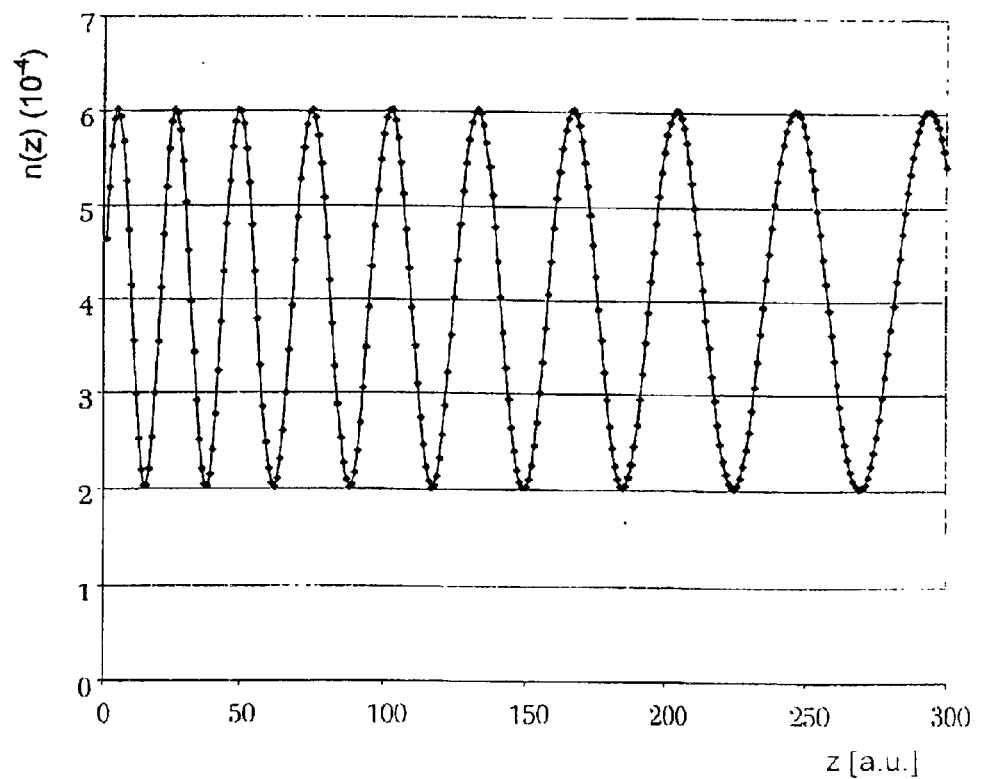
FIG. 1b shows the pattern of the refractive index in a chirped Bragg grating with variable spatial period.
Figure 1C:
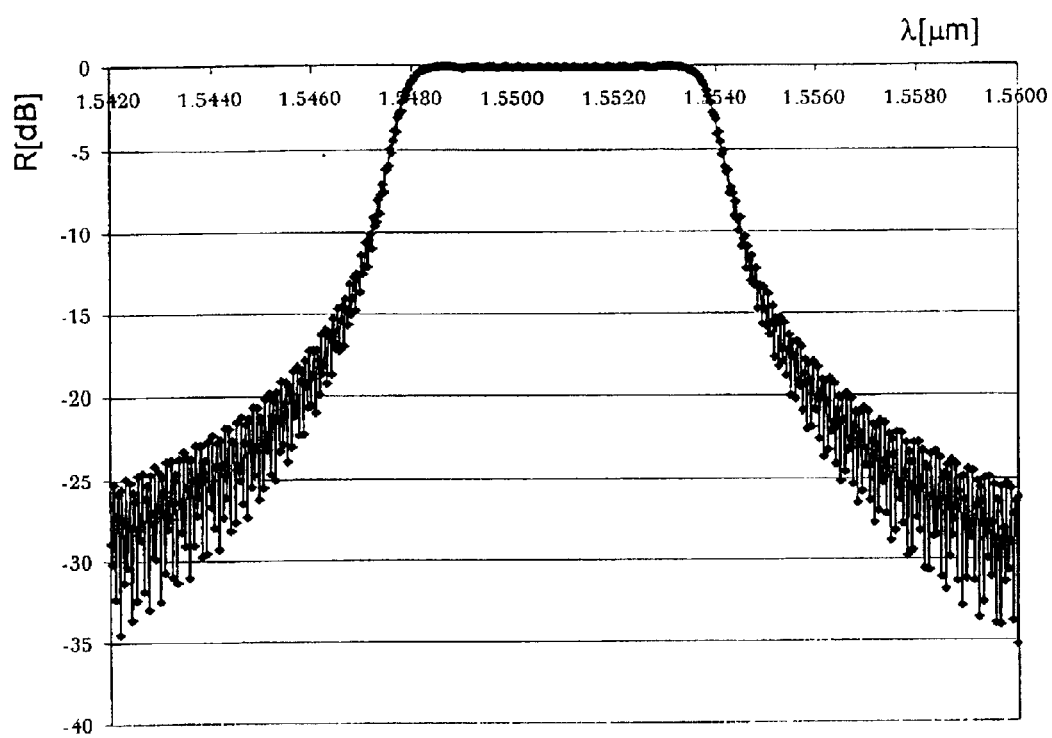
FIG. 1c shows a reflection spectrum of a chirped Bragg grating.
Figure 2:
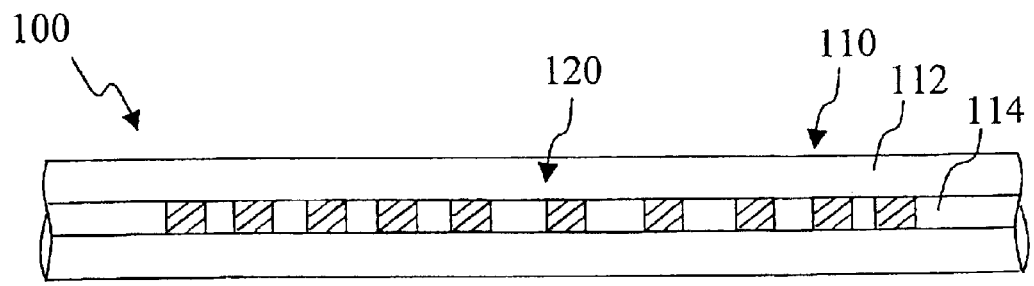
FIG. 2 is a schematic representation of a Bragg grating optical filter according to the present invention.
Figure 3:
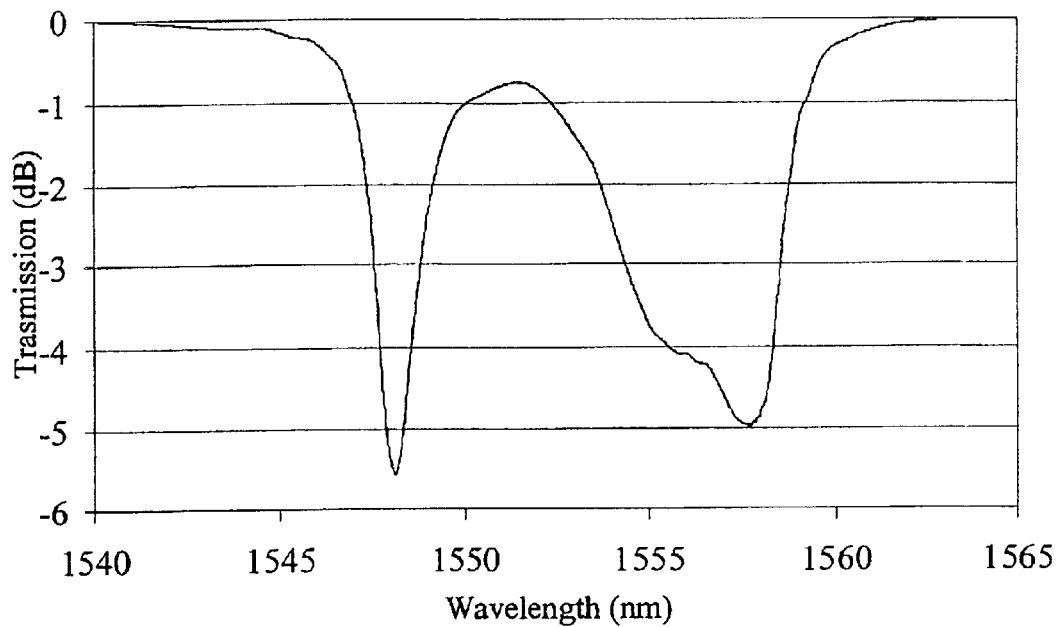
FIG. 3 shows a possible transmission spectrum of an optical filter according to the present invention.

With reference to FIG. 2, an optical filter 100 according to the present invention comprises an optical fibre 110 including a core 112 and a cladding 114, and a Bragg grating 120 written in the core 112 of the fibre. The grating 120 has a refraction index showing a substantially constant refractive index envelope $\Delta n$ and a variable (pitch) chirp rate $d\Lambda/dz$. Bragg grating 120 is preferably a short period grating and, differently from Bragg gratings typically used for gain equalization, has no apodisation of the refractive index, i.e. $\Delta n$ substantially constant. Also, grating 120 has preferably a The chirp rate $d\Lambda/dz$ varies in such a way as to have a transmission spectral response suitable to equalize the gain spectral response of a given optical amplifier. As known, optical amplifiers for optical telecommunication systems have a gain spectrum that shows holes and peaks, thus providing a gain that is strongly dependent on the wavelength of the amplified signal. A typical transmission spectrum of an optical filter suitable to equalize the gain spectrum of an optical amplifier in the wavelength transmission range around 1550 nm is shown in FIG. 3. In the absence of such a filter, in multi-wavelengths telecommunication systems, such as WDM (Wavelength Division Multiplexing) telecommunication systems, each channels would be amplified with a different gain, and the multi-wavelength signal would consequently be unequalized.

Optical filter 100 is a transmissive amplitude filter, i.e. it is suitable to vary the amplitude of optical signals that pass through it, and the reflected fraction of these signals is lost. When filter 100 is passed through by a multi-wavelength optical signal, owing to equation (1) and to the fact that the grating period $\Lambda$ depends on the z coordinate along the fibre, each different wavelength $\lambda$ is reflected in a different axial position along the grating, i.e. $\lambda_B = \lambda_B(z)$. As a result, the grating transmission function T may both be expressed as $T(\lambda)$ or $T(z)$.

It can be shown that, in general, the transmission function T9z) of a Bragg grating is related to the local envelope of the refractive index $\Delta n$ and to the chirp rate $d\Lambda/dz$ as follows:

$$T(z) = \alpha f(\Delta n(z)) \cdot g(d\Lambda/dz) \quad (3)$$

where f and g represent the dependency functions of the grating transmission function of the refractive index modulation $\Delta n$ and the chirp rate $d\Lambda/dz$. The above cited article of M. Ibsen et al. Proposes the following formula relating the transmission loss TL (in dB) for the filter with the fraction $\eta$ of modal power in the core (that will hereinafter considered as constant), the index modulation $\Delta n$ and the chirp rate $d\Lambda/dz$:

$$TL = (\eta \cdot \Delta n)^2 \frac{1.478}{\left|\frac{d\Lambda}{dz}\right|} \quad (4)$$

The transmission loss TL in (dB) is related to the filter transmission T (in dB) simply as follows:

$$TL[dB] = -T[dB] \quad (5)$$

so that $$T[dB] = -TL[dB] = -(\eta \cdot \Delta n)^2 \frac{1.478}{\left|\frac{d\Lambda}{dz}\right|} \quad (6)$$

By using equation (1), equation (4) can be rewritten as follows:

$$TL = (\eta \cdot \Delta n)^2 \cdot 2 \cdot n_{\text{eff}} \cdot \frac{1.478}{\left|\frac{d\Lambda}{dz}\right|} \quad (7)$$

or, equivalently, as follows:

$$TL \cdot d\lambda = (\eta \cdot \Delta n)^2 \cdot 2 \cdot n_{\text{eff}} \cdot 1.478 \cdot dz \quad (8)$$

Equation (8) can be integrated to obtain:

$$\int_{\lambda_{\min}}^{\lambda} TL \cdot d\lambda = \quad (9)$$

$$(\eta \cdot \Delta n)^2 \cdot 2 \cdot n_{\text{eff}} \cdot 1.478 \cdot \int_0^z dz = (\eta \cdot \Delta n)^2 \cdot 2 \cdot n_{\text{eff}} \cdot 1.478 \cdot z$$

where $\lambda_{\min}$ is the minimum wavelength of the filter.

When the target transmission function $T(\lambda)$ is known (which is derived as the complementary of the gain spectrum of the optical amplifier to be equalized, in a predetermined spectral region of interest), the corresponding target transmission loss function $TL(\lambda) = -T(\lambda)$ can be substituted into equation (9) to obtain a function $\lambda = \lambda(z)$, which relates each longitudinal portion of the grating with the wavelength reflected thereat.

This function $\lambda(z)$ can be used into equation (1) to find the dependence of the grating pitch on the z coordinate:

$$\Lambda(z) = \frac{1}{2n_{\text{eff}}} \lambda(z) \quad (10)$$

and the chirp rate:

$$\frac{d\Lambda(z)}{dz} = \frac{1}{2n_{\text{eff}}} \frac{d\lambda(z)}{dz} \quad (11)$$

As concerns the refractive index envelope $\Delta n$, this is related to the target function $TL(\lambda)$ and to the filter length L by the following equation:

$$\int_{\lambda_{\min}}^{\lambda_{\max}} TL \cdot d\lambda = \quad (12)$$

$$(\eta \cdot \Delta n)^2 \cdot 2 \cdot n_{\text{eff}} \cdot 1.478 \cdot \int_0^L dz = (\eta \cdot \Delta n)^2 \cdot 2 \cdot n_{\text{eff}} \cdot 1.478 \cdot L$$

where $\lambda_{\min}$ and $\lambda_{\max}$ are the minimum and the maximum wavelengths of the filter In practice, the maximum value of $\Delta n$ is limited by the characteristics of sensibility of the fibre and on the characteristics of the writing setup. Therefore, once the maximum value of $\Delta n$ has been established, equation (12) permits to establish the length L of the grating that is required to obtain the target transmission function $T(\lambda)$ (or the target transmission loss $TL(\lambda)$).

From this consideration it is possible to understand why a filter according to the present invention allows a reduction of length with respect to a filter including an apodised grating.

To this aim, let's express the transmission loss $TL(\lambda)$ as $TL(\lambda) = TL_{\max} f(\lambda)$, where $TL_{\max}$ is the maximum value of $TL(\lambda)$ and $0 \leq f(\lambda) \leq 1$.

In the filter of the invention, $\Delta n$ can be fixed to the maximum value $\Delta n_{\max}$ allowable by the characteristics of sensibility of the fibre and by the characteristics of the writing setup, and the length of the filter can be derived from equation (12):

$$L_1 = \frac{TL_{\max} \cdot \int_{\lambda_{\min}}^{\lambda_{\max}} f(\lambda) d\lambda}{(\eta \Delta n)^2 \cdot 2 \cdot n_{\text{eff}} \cdot 1.478} \quad (13)$$

In a filter showing apodisation and a constant chirp rate, the chirp rate and, therefore, the function $d\lambda/dz$, are established in such a way as to guarantee that, with an index modulation as high as permitted by the fibre fotosensibility and the writing setup, the value $TL_{\max}$ can be reached. From equation (7) it is therefore derivable that $d\lambda/dz$ shall be fixed as follows:

$$\frac{d\lambda}{dz} = (\eta \cdot \Delta n)^2 \cdot 2 \cdot n_{\text{eff}} \cdot \frac{1.478}{TL_{\max}} \quad (14)$$

By integrating equation (1), the following equation is obtained:

$$\Delta\lambda = (\eta \cdot \Delta n)^2 \cdot 2 \cdot n_{\text{eff}} \cdot \frac{1.478}{TL_{\max}} L \quad (15)$$

and the length $L_2$ of such a filter is therefore:

$$L_2 = \frac{\Delta\lambda \cdot TL_{\max}}{(\eta \Delta n)^2 \cdot 2 \cdot n_{\text{eff}} \cdot 1.478} \quad (16)$$

By comparing equations (13) and (16), it is evident that $L_1 < L_2$. In fact, $L_1$ can be equal to $L_2$ only when $f(\lambda) = 1$ for every value of $\lambda$, i.e. if $TL(\lambda)$ is constant and equal to $TL_{\max}$, which is not the case of a gain flattening filter.

The reduction of length obtainable with the filter of the present invention with respect to a known apodised filter is therefore:

$$\Delta L = \frac{L_2 - L_1}{L_2} = 1 - \frac{\int_{\lambda_{min}}^{\lambda_{max}} f(\lambda) d\lambda}{\Delta \lambda} \quad (17)$$

For example, with respect to a known apodised filter having the following apodisation function:

$$f(\lambda) = \frac{1}{2}\left[1 - \cos\left(\frac{2\pi(\lambda - \lambda_1)}{\Delta\lambda}\right)\right] \quad (18)$$

a reduction of length of 50% is obtained.

The Applicant has verified that, with respect to an apodised filter showing the transmission loss $TL(\lambda)$ of FIG. 3, a length reduction of approximately 40% is achieved.

The length of a gain flattening filter is a very important parameter, since these devices are typically housed in an athermal package, which shall be dimensioned according to the length of the filter.

Figure 4A:
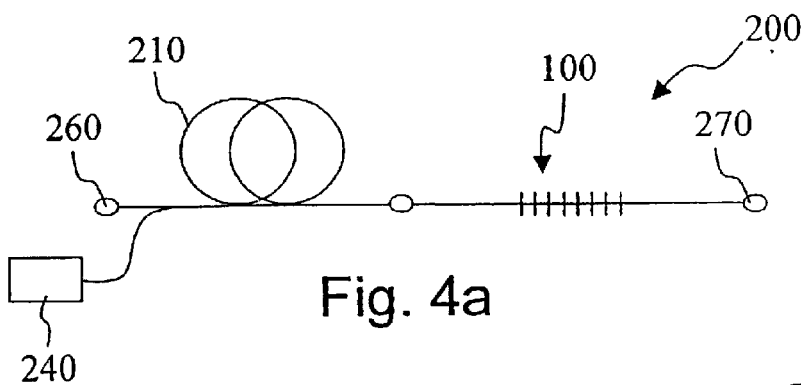
FIGS. 4a and 4b show two possible embodiments of an amplification device according to the present invention.
Figure 4B:
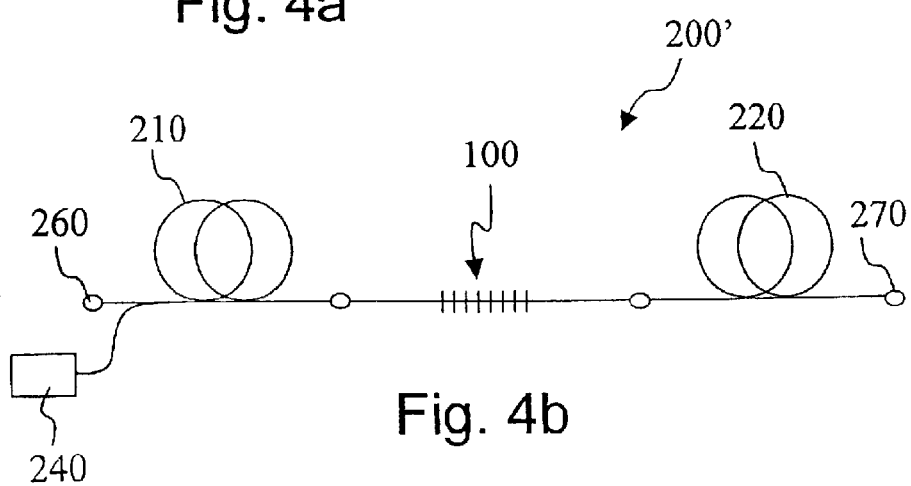

Filter 100 can be used to implement a single-stage optical amplifier 200 as shown in FIG. 4a or a dual-stage optical amplifier 200' as shown in FIG. 4b. Single-stage optical amplifier 200 comprises an active fibre 210 having a pre-determined wavelength-dependent gain and the optical filter 100 arranged in series to the active fiber 210. Amplifier 200 has an input 260 and an output 270 for optical coupling with the optical fibres carrying the signals. Amplifier 200 also comprises a pumping system to excite active fibre 210, in the particular case a single pump source 240 providing a co-propagating pumping, coupled to the active fibre 210 by an optical coupler of a known type. Different pumping systems can be provided, for example counter-directional or bi-directional pumping, and each pump source may comprise a single pump laser or a plurality of pump lasers opportunely combined. Optical filter 100 has a spectral transmission that substantially equalize the spectral gain of the active fibre 210, so that unequalized channels of a multi-wavelength optical signal exiting the active fibre 210 can be output with substantially the same optical power.

Dual-stage optical amplifier 200' further comprises a second active fibre 220 arranged in series to the first active fibre 210. The optical filter 100 is interposed between the two active fibres 210 and 220. Output 270 is now defined by the end of the second active fibre 220 not joined with filter 100. As for the single-stage optical amplifier 200, each active fibre may be pumped co-directionally, bi-directionally or counter-directionally, by single-laser pump sources or multiple-laser pump sources.

Optical isolators (not shown) may also be provided in series to the active fibre(s), to avoid scattered light to travel back towards the input 260.

Figure 5:
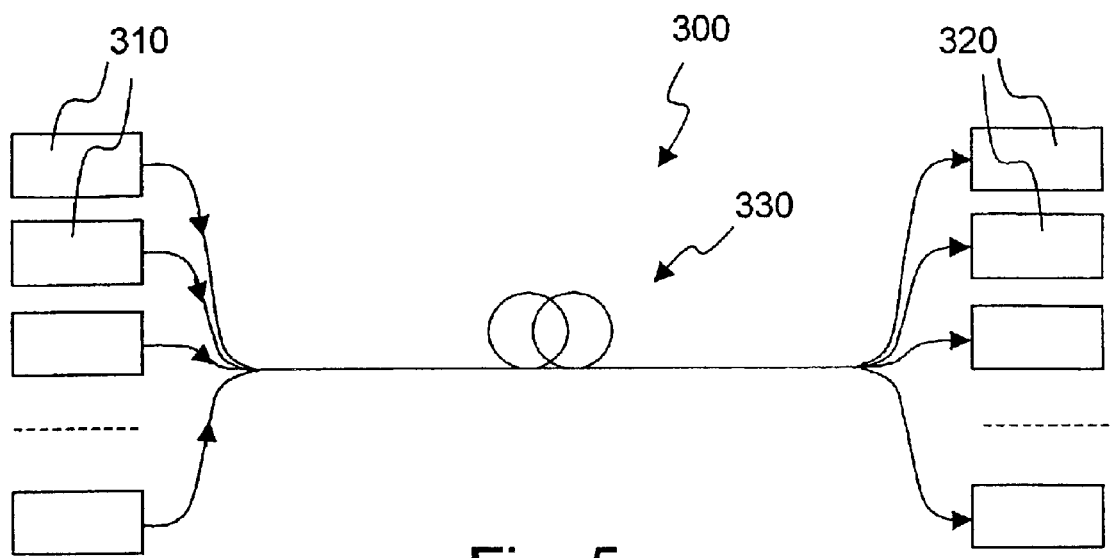
FIG. 5 show a WDM transmission system comprising the amplification device of FIG. 4a or of FIG. 4b.

As shown in FIG. 5, amplification device 200 or 200' may be part of a WDM transmission system 300 comprising a plurality of optical transmitters 310 (usually laser units provided of an internal or external modulation device) for transmitting optical signals at respective wavelengths, a plurality of optical receivers 320 for receiving said optical signals, and an optical fibre line 330. The amplification device may be positioned either at the transmission stage for providing a sufficient amount of power to the transmitter signals, along the line for compensating the losses due to signal transmission along the optical fibres, and/or at the transmission stage, for providing the optical signal with sufficient power for a correct reception thereof.

Figure 6:
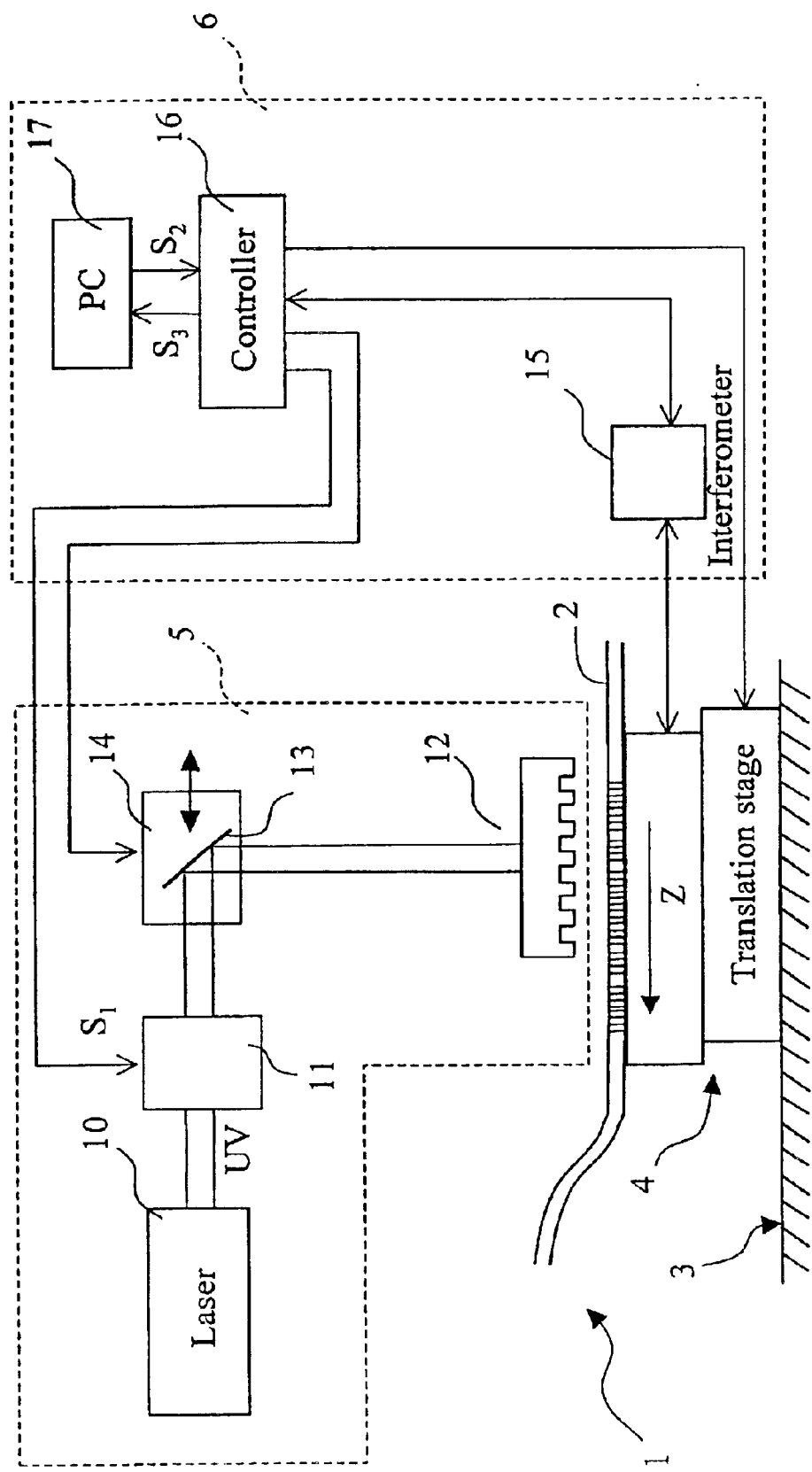
FIG. 6 illustrates an apparatus for producing an optical filter according to the present invention.

FIG. 6 shows a fibre grating writing apparatus 1 adapted to produce optical filters such as optical filter 100. Apparatus 1 comprises a fibre translation stage 4, a UV fringes generation device 5 and a control system 6 connected to the fibre translation stage 4 and to the UV fringes generation device 5 for controlling the operation thereof.

The translation stage 4 is positioned on a horizontal basement 3 and is adapted to carry the fibre 2 in a movable writing position. The translation stage 4 may comprise a roller bearing translation device, such as a Newport PMLW160001, which allows for a continuous scan over 40 cm. In general, the translation stage 4 may be any device able to continuously and steadily translate the fibre 2 along its axis during the grating exposure process.

The UV fringes generation device 5 preferably comprises a UV laser 10 for generating a UV beam, an acoustic-optic modulator 11 positioned in front of laser 10 in the direction of the beam emission and suitable to switch ON and OFF the UV beam according to a control signal $S_1$ received from the control system 6, a mirror 13 for deflecting the UV beam towards the fibre 2, and a phase mask 12 facing the fibre 2 and positioned so as to receive the deflected UV beam and generate a UV fringe pattern illuminating the fibre.

Laser 10 may be a coherent FRED laser adapted to generate a UV light at a wavelength of 244 nm and operating on the first order.

Acoustic-modulator 11 may be, for example, model M 110-4 (BR) produced by Gooch & Housego.

Mirror 13 is mounted on a linear translation device 14, which allows moving the mirror 13 along the direction of the UV beam emitted by laser 10, so as to scan the UV beam on the phase mask 12. Linear translation device 14 may be, for example, model M-UTM50CC1DD produced by Newport Corporation.

Phase mask 12 is preferably a short (~20 mm) linearly chirped phase mask, for example a standard chirped phase mask produced by ADC Danmark ApS.

Control system 6 preferably comprises a differential interferometer 15, for example model Zygo, ZMI1000, to continuously monitor the relative position of fibre 2 with respect to the interference pattern of the phase mask 12. Differential interferometer 15 is adapted to continuously output a digit number, for example a 32-bit number, indicative of the position of the fibre 2 along a translation direction Z with a predetermined resolution, for example a ~1.24 nm resolution. This digit number will hereinafter referred to as a "position value".

Control system 6 further comprises a controller 16 electrically connected to the translation stage 4, to the acoustic-optic modulator 11, and to the translation device 14 for controlling the operation thereof, and to the interferometer 15 for exchanging information with it.

Moreover, control system 6 is adapted to compare the current position value provided by the interferometer 15 with switching position data contained in a signal $S_2$ received from a computer 17, for determining whether the UV beam should be ON or OFF at that position. Control system 6 comprises a comparison circuit for comparing each position value output by the interferometer 15 with the switching position data currently output by the computer 17. If, for illustration, the interferometer 15 is arranged so that the position values numerically increases as the fibre scan proceeds, then the controller 16 detects when the position value becomes greater than or equal to the current switching position data received from the computer 17. When that condition is satisfied, the controller 16 toggles the state of the modulation control signal $S_1$ used to control the acousto-optic modulator 11, i.e. from OFF to ON and vice-versa.

The controller 16 is also designed to send a signal $S_3$ back to the computer 17, whenever a switching condition occurs, for requesting the next switching position data corresponding to the next switching position.

Switching ON and OFF the UV beam at instants related to the longitudinal position of the fibre allows writing the Bragg grating, since the interference pattern arising from successive exposures through the phase mask can be superimposed. Conversely, if the fibre were scanned with the UV beam continuously directed onto the fibre, no grating would be written since the grating lines would be washed out by the movement.

The functioning of apparatus is herein below described.

The UV beam is modulated by the acousto-optic modulator 11, according to signal $S_1$ received from controller 16, in a periodic fashion synchronized with the translation of the fibre 2. In this way, each exposure generates a periodic refractive index change overlapping that of the previous exposure. The periodicity of the refractive index variation is related to the pitch of the phase mask 12 in the point thereof impinged by the UV beam, in particular it is half the pitch of the phase mask 12 in that point. Thus, the refractive index change providing each individual grating "element" or fringe is actually generated or built up by the cumulative effects of multiple exposures through different parts of the phase mask as the fibre moves along behind the phase mask. This means that the optical power needed to generate the grating can be distributed between potentially a large number of exposures, so each exposure can be of a relatively low power (which in turn means that the output power of the laser 10 can be relatively low).

Although each of the successive exposures of the fibre to UV light though the phase maksc 12 could be a very short pulse (to "freeze" the motion of the fibre as the exposure is made), this has not proved necessary and in fact the present embodiment uses an exposure duty cycle (i.e. the fraction $\Delta\Lambda_{ON}/\Lambda$ of the period that the beam is on) in a range from below 10% to about 50%, although a wider range of duty cycles is possible. As the duty cycle of the UV exposure increase, the grating contrast decreases (because of motion of the fibre during the exposure) but the writing efficiency increases (because more optical energy is delivered to the fibre per exposure). Thus, selection of the duty cycle to be used is a balance between these two requirements. Experimentally, a good value for $\Delta\Lambda_{ON}/\Lambda$ has been found to be ~0.3–0.4.

Exposure of the grating lines or elements is repeated every grating period. Thus the footprint defined by the UV beam, which might for example for a 500 µm diameter beam, $\Phi_{beam}$, consists of $\Phi_{beam}/\Lambda(\sim 1000)$ lines, is significantly overlapped with the previously exposed lines. Significant averaging of the writing process given by $(\Phi_{beam}/\Lambda)^{1/2}$ is therefore achieved, thus improving the effective accuracy and resolution of the system.

The computer preferably generates the switching positions internally as "real" numbers (obviously subject to the limitation of the number of bits used), but then converts them for output fo the controller 16 into the same unit system as that output by the Zygo interferometer, namely multiples of a "Zygo unit" of 1.24 nm. This internal conversion by the computer 17 makes the comparison of the actual position and the required switching position much easier and therefore quicker for the controller. A random digitisation routine is employed in the computer 17 to avoid digitisation errors during the conversion from real numbers to Zygo units. This involves adding a random amount in the range of ±0.5 Zygo units to the real number position data before that number is quantised into Zygo units. Thus an effective resolution can be obtained of 1.24 nm/$(\Phi_{beam}/\Lambda)^{1/2} \approx 0.03$ nm.

As the fibre 2 is translated, the UV beam is scanned by translating the mirror 13 parallel to fibre 2. Scanning of the UV beam, besides inducing by itself a small chirp, leads the translated beam to access writing lines of the linearly chirped phase mask 12 having a different period, thus allowing large chirps to be built up. If the scanning were performed at a constant velocity, a linearly chirped grating would have been obtained. Conversely, to obtain a chirp rate as previously described, the scanning of the UV beam is performed at variable velocity, in particular with a velocity $v_{sc}(t)$ that is related to the target transmission function $T(\lambda)$ as described below.

As each position value is output by the interferometer 15, the controller 16 compares the at position value with the switching position data currently output by the computer 17. If, for illustration, the interferometer 15 is arranged so that the position values numerically increase as the fibre scan proceeds, then the controller 16 detects when the position value becomes greater than or equal to the current switching position data received form the computer 17. When that condition is satisfied, the controller 16 toggles the state of the modulation control signal, i.e. from OFF to ON and vice-versa. At the same time, the controller 16 sends a signal back to the computer 17 requesting the next switching position data corresponding to the next switching position.

The process is stopped when the desired grating length has been reached.

The relation between the scan velocity $v_{sc}(t)$ and the target transmission function $T(\lambda)$ can be derived as follows.

The pitch $\Lambda_{PM}(x)$ of the linearly chirped phase mask along an axis x parallel to the axis of the fibre can be expressed as $$\Lambda_{PM}(x) = \Lambda_{PM,0} + CR_{PM} \cdot x \quad (19)$$

where $\Lambda_{PM,0}$ and $CR_{PM}$ are the central period and the chirp rate of the phase mask, respectively.

As previously stated, the local pitch $\Lambda(z)$ of the grating is half of the pitch $\Lambda_{PM}(z)$ of the corresponding portion of phase mask, i.e.:

$$\Lambda(z) = \frac{\Lambda_{PM}(x)}{2} = \frac{\Lambda_{PM,0} + C_{RPM} \cdot x}{2} \quad (20)$$

It is thus possible to express the x coordinate along the phase mask as:

$$x = \frac{2\Lambda(z) - \Lambda_{PM,0}}{CR_{PM}} \quad (21)$$

and scan velocity $v_{sc}(t)$ as:

$$v_{sc}(t) = \frac{dx}{dt} = \frac{2}{CR_{PM}} \frac{d\Lambda(z)}{dt} \quad (22)$$

or according to equation (10):

$$v_{sc}(t) = \frac{1}{CR_{PM} \cdot n_{eff}} \frac{d\lambda(z)}{dt} = K \cdot \frac{d\lambda(z)}{dt} \quad (23)$$

where K is a constant.

When the target transmission loss function $TL(\lambda)$ (or, equivalently the target transmission function $T(\lambda)$) is know, $\lambda(z)$ can be obtained from equation (8). Moreover, since the fibre is translated at a constant speed $v_f$, the z coordinate can be expressed as $z=v_f t$ and a final expression for $v_{sc}(t)$ that, under the writing conditions described above, realizes a grating chirp rate giving rise to a transmission function substantially corresponding to the target transmission function.

Numeric Simulations and Experimental Measures

Numeric simulations and experimental measures have been performed to test the validity of the above-described writing technique.

Figure 9:
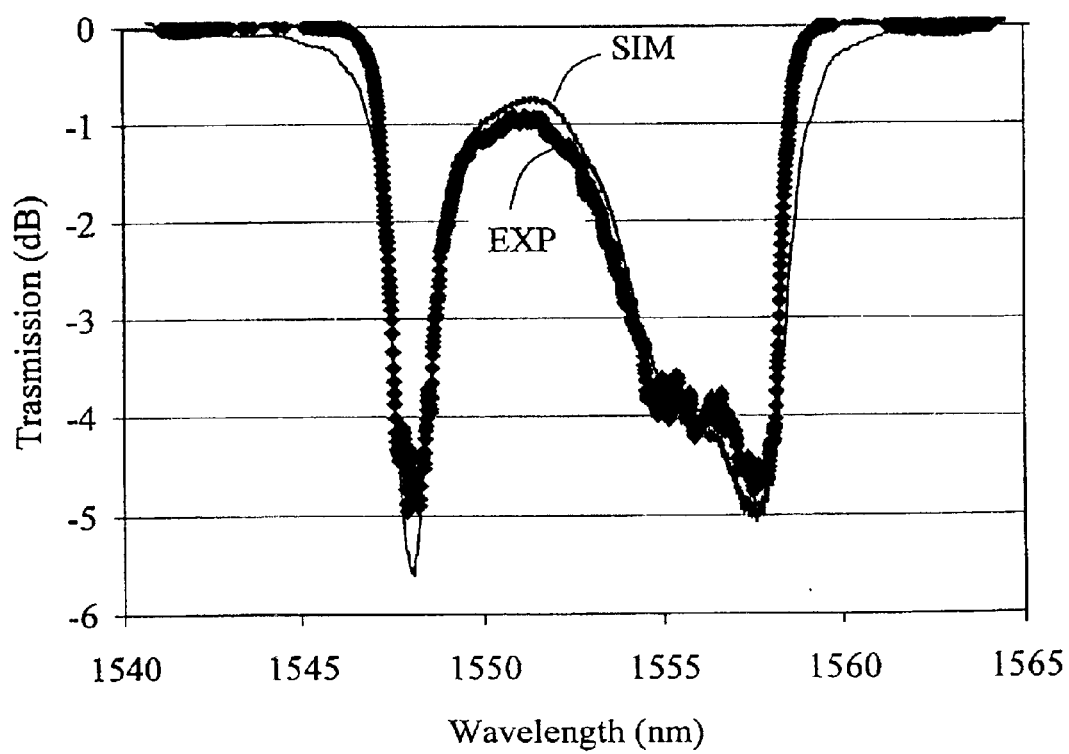
FIG. 9 shows the simulated and the measured spectra of an optical filter according to the present invention.
Figure 7:
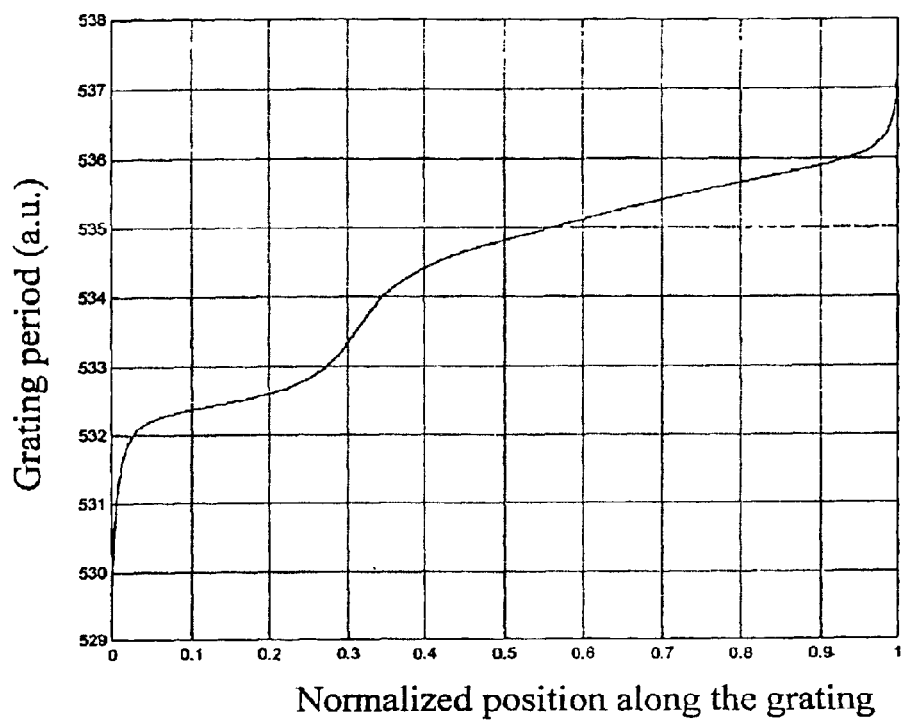
FIGS. 7 and 8 show the grating period and the chirp rate of an optical filter according to the present invention.
Figure 8:
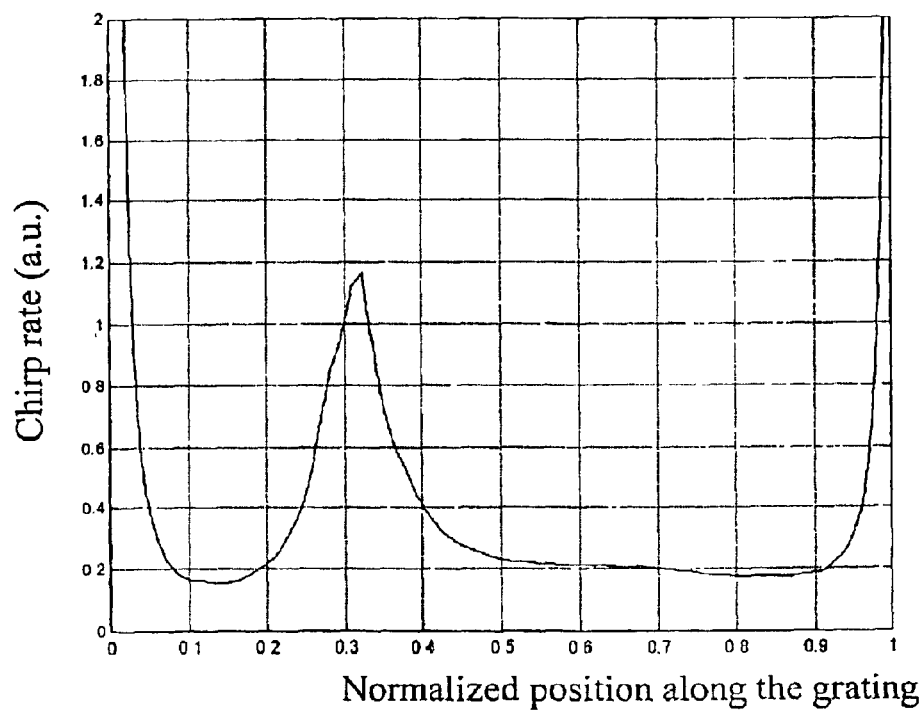

The numeric simulations have been performed by choosing a grating length of 60 mm, a grating wavelength band of 12 nm and a refractive index modulation envelope of $4\ 10^{-4}$. The target transmission spectrum $T(\lambda)$ shown in FIG. 3 has been utilized in the simulations. The longitudinal trends for the grating period and chirp rate for such a Bragg grating are shown in FIG. 7 and FIG. 8, respectively, while curve SIM in FIG. 9 represents the computed transmission spectral response.

Experimental measures have been performed in the following conditions and with the following parameters:

UV laser: frequency doubled $Ar^+$;

UV laser wavelength: 244 nm;

UV laser power: 135 mW;

Fibre translation velocity: 3 mm/s

Mirror translation velocity $v_{sc}(t)$: according to equations (23) and (9);

Phase-mask chirp rate (linear chirp): 7.65 nm/cm;

Phase mask length: 25 mm;

Phase mask central period: 1071.2 nm;

Fibre single-mode loaded with $D_2$. Deuterium loading has been carried out placing the fibre in $D_2$ atmosphere for 5 days at 50° C., 150 bar.

FIG. 9, curve XP, shows the result of the above measure. It can be observed that the experimental results substantially confirm the results obtained by numeric simulation.

What is claimed is:

1. An optical signal amplification device, comprising an optical amplifier (200, 200') having a wavelength-dependent gain in a predetermined wavelength band and an equalization device (100) optically coupled in series to the optical amplifier and having a wavelength-dependent transmission function that substantially equalizes the gain of the optical amplifier in said wavelength band, the equalization device comprising a waveguide Bragg grating having a substantially constant refractive index envelope and a chirp rate that varies in such a way as to obtain said wavelength-dependent transmission function.

2. The optical signal amplification device of coma 1, wherein the waveguide is an optical fibre.

3. The optical signal amplification device of claim 1, wherein the optical amplifier (200) comprises an active fibre (210) couple din series to the equalization device (100).

4. The optical signal amplification device of claim 1, wherein the optical amplifier (200') comprises a first and a second active fibre (210,220), the equalization device (100) being interposed between the first and the second active fibre.

5. An optical transmission system, comprising at least an optical transmitter (310) adapted to generate optical signals, an optical transmission line (330) for transmitting the optical signals, and at least an optical receiver (320) for receiving the optical signals from the optical transmission line, wherein at least one of said optical transmitter, optical transmission line and optical receiver comprises an optical signal amplification device according to claim 1.

6. A gain flattening optical filter (100), comprising an optical waveguide Bragg grating (120) having a substantially constant refraction index envelope and a chirp rate that varies in such a way as to have a transmission spectral response suitable to equalize the gain spectral response of a predetermined optical amplifier in a predetermined wavelength band.

7. The gain flatting optical filter of claim 6, wherein the optical waveguide is an optical fibre (110).

8. The gain flattening optical filter of claim 6, wherein it is a transmissive amplitude filter.

9. A method of manufacturing an optical filter suitable for gain equalization of an optical amplifier in a predetermined wavelength band, comprising the steps of providing a photosensitive waveguide in a writing position along a z axis;

scanning a UV beam at a first velocity along the z axis through a linearly chirped phase mask facing the photosensitive waveguide, so as to generate UV fringe patterns; and translating the photosensitive waveguide at a second velocity along the z axis during scanning, so as to expose different portions of the photosensitive waveguide to successive UV fringe patterns; and modulating the UV beam in a periodic way related to the position of the photosensitive waveguide during translation thereof, so as to superimpose successive UV fringe pattern exposures;

characterized in that said step of scanning comprises varying the first velocity in such a way as to produce a nonlinearly-chirped Bragg grating having a substantially constant refractive index envelope and a transmission function suitable to equalize the gain spectrum of said optical amplifier in said wavelength band.

10. The method of claim 9, wherein the second velocity is substantially constant.

11. The method of claim 9, wherein scanning the UV beam comprises translating a mirror that deflects the UV beam.

\* \* \* \* \*